W. E. HOLLAND.
BATTERY CELL COVER.
APPLICATION FILED JULY 13, 1920.
1,371,895. Patented Mar. 15, 1921.
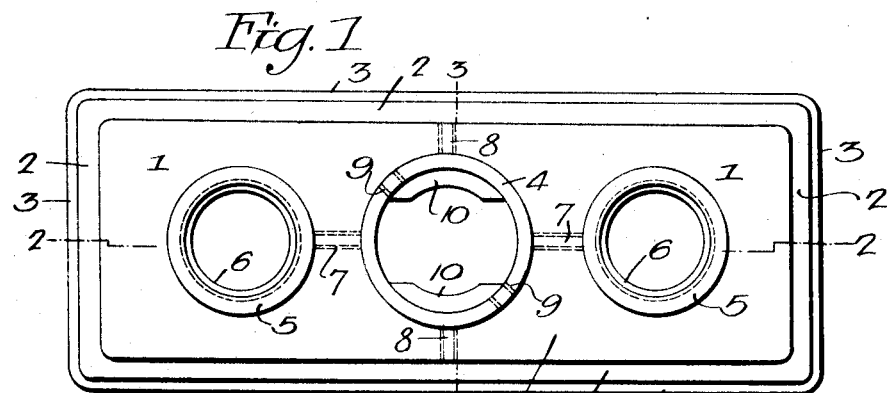
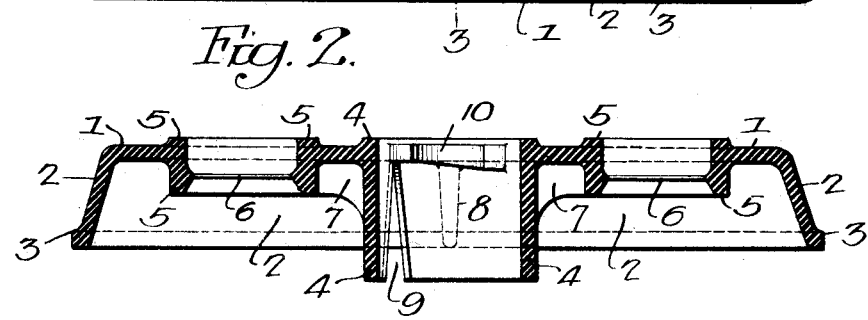
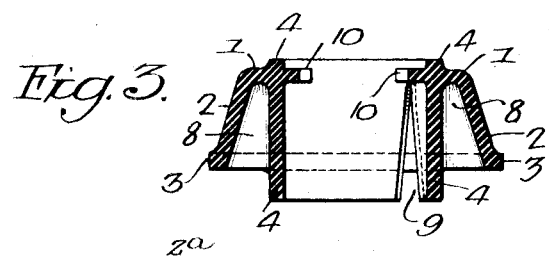
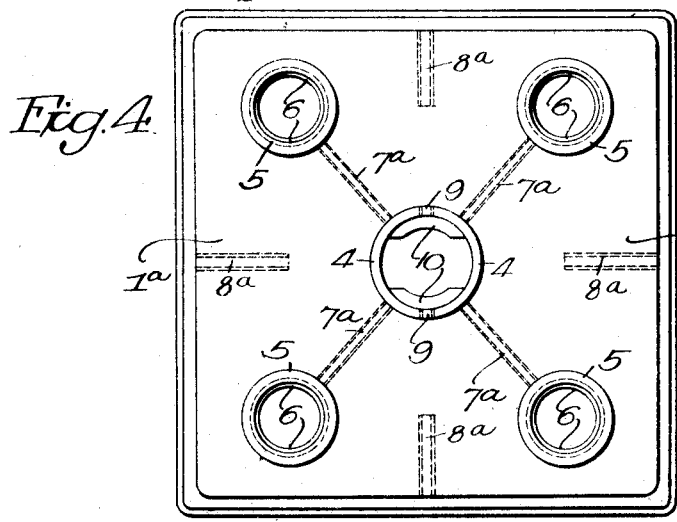
Inventor
Walter E. Holland
by his Attorneys
Howson
& Howson

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

BATTERY-CELL COVER.

1,371,895.  Specification of Letters Patent.  Patented Mar. 15, 1921.

Application filed July 13, 1920. Serial No. 395,827.

*To all whom it may concern:*

Be it known that I, WALTER E. HOLLAND, a citizen of the United States, residing in Philadelphia, Pennsylvania, have invented Battery-Cell Covers, of which the following is a specification.

One object of my invention is to provide a form of cover or closure for battery cells, whose construction shall be such that it may be readily molded to accurate dimensions and which will come out of the mold in which it is shaped with its post or terminal holes true and properly positioned; the arrangement of parts being such that the cover will have high structural strength and will have its material so disposed that it will retain its original shape under conditions of use.

Another object of my invention is to provide a battery cell cover whose construction shall be such as to stiffen and strengthen its relatively flat central portion with a view to preventing its deformation under conditions both of manufacture and of use; the parts of said invention being especially designed with a view to utilizing the flanges of the filling or vent opening and of the terminal post openings as portions of a structure or combination of parts whereby the desired strength and stiffness is imparted to the cover. It is further desired to provide a battery cell cover which while possessing the above characteristics, shall permit of the free escape of the explosive gas mixture, formed during charging of a battery, which is liable otherwise to collect in pockets incidental to the construction employed.

These objects and other advantageous ends I attain as hereinafter set forth, reference being had to the accompanying drawings, in which, Figure 1 is a plan of a battery cover constructed in accordance with my invention;

Figs. 2 and 3 are vertical sections on the lines 2—2 and 3—3, Fig. 1; and

Fig. 4 is a plan of another form of battery cover utilizing my invention.

In the above drawings, the cover shown consists of a molded or cast mass of suitable material, such as hard rubber, which includes a generally flat body portion 1 having a rectangular outline and depending edges or flanges 2 extending outwardly at their lower extremities for a short distance as indicated at 3. Placed substantially at the center of the body 1 is a sleeve 4 constituting a well for filling and venting the cell with which the cover is used, and this usually projects a short distance above the top of the body 1 and extends below the same a certain distance to define or determine the correct electrolyte level for convenience in replenishing the cell with water.

On either side of the sleeve 4 are two terminal post openings each having a sleeve 5 extending downwardly below the body portion 1 as well as slightly above its top surface. Each of said sleeves 5 has an inwardly extending annular rib 6 of angular section for coaction with the resilient sealing packing on a terminal post and between each of these sleeves and the sleeve 4 is a stiffening rib 7 whereby the various portions are braced and tied together;—the two sleeves 5 with the two ribs 7 and the central sleeve 4 together with the body portion 1 constituting in effect a truss structure or beam whereby said body portion is materially strengthened and stiffened and that to an extent sufficient not only to permit the finished cover to be drawn without deformation from the mold in which it is shaped, but also to hold it from warping under conditions of use.

In addition to the reinforcing ribs 7, two other ribs 8 may extend between the sleeve 4 and the peripheral flange 2 of the cover, thus bracing said flange as well as further stiffening the body portion 1. In order to permit the free escape of gases from the space within the cover defined by the top 1 thereof and the flange 2, I form in the sleeve 4 suitable openings 9 which in the present instance are in the form of slots tapering, for convenience in molding, from the lower edge of said sleeve to the level of the under surface of the body 1. In the present instance I have provided two of these openings each of which will freely pass or vent into the sleeve 4, the gas collecting in one half of the cover.

In the structure illustrated the sleeve 4 is shown as having two inwardly extending projections or abutments 10 whose undersurfaces are inclined to the plane of the body 1 and which serve as means to lock in place a vented closure such as a plug or a cap of suitable construction.

In case the cover has four instead of two terminal post openings with their associated sleeves or flanges 5, as illustrated in Fig. 4, I preferably connect the sleeve of each of said openings with the central filling and vent sleeve 4 by ribs 7ª, extending radially thereof and provide said sleeve with gas escape openings 9 as illustrated, to freely conduct the gas away from the interior of said cover. I also preferably brace the side portions of the body with ribs 8ª extending from the side flanges 2ª toward the central sleeve 4.

As in the previous instance, said ribs serve to strengthen and stiffen the relatively flat top surface of the cover indicated at 1ª so that it is effectually prevented from warping and, as in the case illustrated in Fig. 1, the distance between as well as the alinement of the centers of the terminal post openings is maintained without such alteration as would occur in case the cover, and particularly the body portion thereof, became warped or bent out of its plane form; and this stiffening is accomplished without the formation of pockets such as would tend to hold the battery gases and possibly cause a ruinous explosion if ignited,—as may not infrequently happen when a workingman is using a flame on the sealing or connections at the top of a cell.

I claim:—

1. A battery cell cover including a substantially flat body portion having a filling opening and terminal post openings; sleeves in said filling and terminal post openings respectively; with bracing ribs extending between said sleeves.

2. The combination in a battery cell cover of a substantially flat body portion having a peripheral flange and formed with a filling opening and terminal post openings; sleeves defining said openings; and ribs extending between the sleeve of the filling opening and the sleeves of the terminal post openings.

3. The combination in a battery cell cover of a substantially flat body portion having a peripheral flange and formed with a filling opening and terminal post openings; sleeves defining said openings; and ribs extending between the sleeve of the filling opening and the peripheral flange, and also between said sleeve and the sleeves of the terminal post openings.

4. The combination in a battery cell cover of a substantially flat body portion having a peripheral flange and formed with a substantially central filling opening and terminal post openings; sleeves defining the filling and terminal post openings, and extending downwardly from the under side of the flat body portion; with reinforcing ribs connecting the sleeves of the terminal post openings with the sleeve of the filling opening.

5. The combination in a battery cell cover of a substantially flat body portion having a peripheral flange and formed with a substantially central filling opening and terminal post openings; sleeves defining the filling and terminal post openings and extending downwardly from the under side of the flat body portion; reinforcing ribs on said body portion connecting the sleeves of the post openings with the sleeve of the filling opening; and other ribs connecting said latter sleeve with the peripheral flange of the body portion.

6. The combination in a battery cell cover of a substantially flat body portion having a peripheral flange and formed with a substantially central filling opening and terminal post openings; sleeves defining the filling and terminal post openings and extending downwardly from the under side of the flat body portion; reinforcing ribs on said body portion connecting the sleeves of the post openings with the sleeve of the filling opening; and other ribs connecting said latter sleeve with the peripheral flange of the body portion, there being openings through the central sleeve for permitting escape of gas from the chamber formed by the body portion and the flange of the cover.

7. The combination in a battery cell cover of a substantially flat body portion having a peripheral flange and formed with a filling opening and terminal post openings; sleeves defining said openings; ribs extending between the sleeve of the filling opening and the sleeves of the terminal post openings; and other ribs extending from the peripheral flange along the flat body portion.

8. The combination in a battery cell cover of a body portion having one or more openings formed with flanges; and ribs associated with said flanges for reinforcement, there being a gas venting opening in one of said flanges to allow the escape of gas from the entire space beneath the cover.

9. The combination in a battery cell cover of a body portion having a peripheral flange and one or more flanged openings; and ribs extending from the peripheral flange toward one of the flanged openings; the latter having an opening positioned to vent the gas from the cavity defined by the peripheral flange, the ribs and the flanges of said opening or openings.

10. The combination in a battery cell cover of a body portion having a peripheral flange and one or more flanged openings; and ribs extending inwardly from the peripheral flange; the latter having an opening positioned to vent the gas from the cavity defined by the peripheral flange, the ribs and the flanges of said opening or openings.

11. The combination in a battery cell cover of a substantially flat body having a peripheral flange and a plurality of flanged openings; ribs extending from the peripheral flange toward the flange of one of the openings; and other ribs extending between the flanges of the openings there being one or more vents in the flange of one of the openings to allow escape of gas from the space or spaces defined by the ribs and flanges.

WALTER E. HOLLAND.